(12) United States Patent
Xuan et al.

(10) Patent No.: US 12,739,474 B2
(45) Date of Patent: Sep. 15, 2026

(54) LIVE-STREAMING RESERVATION METHOD AND APPARATUS, AND DEVICE, MEDIUM AND PRODUCT

(71) Applicant: Beijing Zitiao Network Technology Co., Ltd., Beijing (CN)

(72) Inventors: Hui Xuan, Beijing (CN); Tiantian Zhang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/867,186

(22) PCT Filed: Sep. 15, 2023

(86) PCT No.: PCT/CN2023/119228
§ 371 (c)(1),
(2) Date: Nov. 19, 2024

(87) PCT Pub. No.: WO2024/056088
PCT Pub. Date: Mar. 21, 2024

(65) Prior Publication Data

US 2025/0358480 A1 Nov. 20, 2025

(30) Foreign Application Priority Data

Sep. 16, 2022 (CN) ........................ 202211131981.4

(51) Int. Cl.
*H04N 21/47* (2011.01)
*H04N 21/2187* (2011.01)
*H04N 21/431* (2011.01)
*H04N 21/472* (2011.01)

(52) U.S. Cl.
CPC ... *H04N 21/47214* (2013.01); *H04N 21/2187* (2013.01); *H04N 21/4312* (2013.01)

(58) Field of Classification Search
None
See application file for complete search history.

(56) References Cited

U.S. PATENT DOCUMENTS

2020/0221145 A1* 7/2020 Turgut ................ H04N 21/262

FOREIGN PATENT DOCUMENTS

CN 104104524 A 10/2014
CN 105141682 A 12/2015
CN 106303734 A 1/2017
(Continued)

OTHER PUBLICATIONS

ISA China National Intellectual Property Administration, International Search Report Issued in Application No. PCT/CN2023/119228, Dec. 5, 2023, 5 pages.
(Continued)

*Primary Examiner* — Samira Monshi
(74) *Attorney, Agent, or Firm* — Alleman Hall LLP

(57) ABSTRACT

The embodiment of the disclosure provides method for livestream reservation, an apparatus, a medium and a product. The method includes: displaying a reservation control on a livestreaming page of a current livestream of a target streamer before determining livestreaming information of a livestream to be started corresponding to the target streamer; and in response to a trigger operation for the reservation control, reserving the livestream to be started of the target streamer.

20 Claims, 6 Drawing Sheets

(56) References Cited

FOREIGN PATENT DOCUMENTS

| | | | |
|---|---|---|---|
| CN | 112468866 | A | 3/2021 |
| CN | 113015012 | A | 6/2021 |
| CN | 113449593 | A | 9/2021 |
| CN | 113992935 | A | 1/2022 |
| CN | 114257832 | A | 3/2022 |
| CN | 114296611 | A | 4/2022 |
| CN | 115550676 | A | 12/2022 |
| JP | 2009182890 | A | 8/2009 |
| JP | 2010178191 | A | 8/2010 |
| JP | 2010245773 | A | 10/2010 |
| WO | 2022142944 | A1 | 7/2022 |

OTHER PUBLICATIONS

Japan Patent Office, Office Action Issued in Application No. 2024574623, Dec. 2, 2025, 6 pages.

China National Intellectual Property Administration, Office Action and Search Report Issued in Application No. 202211131981.4, Jan. 14, 2026, 14 pages.

China National Intellectual Property Administration, Notice of Allowance issued in Application No. 202211131981.4, Jul. 21, 2026, 6 pages.

Bobo's digital world, "How to set a streamer's start notification on Tik Tok?, " Baidu, Available Online at https://jingyan.baidu.com/article/c843ea0b90d01e36931e4afe.html, Aug. 27, 2021, 14 pages.

Talk the principal, "No need to unfollow—two ways to solve the "Video Account Live Stream Strong Notification"," Zhihu, Available Online at https://zhuanian.zhihu.com/p/352642543, Feb. 24, 2021, 5 pages.

* cited by examiner

LIVE-STREAMING RESERVATION METHOD AND APPARATUS, AND DEVICE, MEDIUM AND PRODUCT

CROSS-REFERENCE TO RELATED APPLICATIONS

This application is a national stage of International application PCT/CN2023/119228 filed on Sep. 15, 2023. This International application claims priority to Chinese Patent Application No. 202211131981.4, entitled "LIVE-STREAMING RESERVATION METHOD AND APPARATUS, AND DEVICE, MEDIUM AND PRODUCT" filed on Sep. 16, 2022. All of these applications are hereby incorporated by reference in their entireties.

FIELD

The embodiment of the present disclosure relates to the technical field of computers, in particular to a method for livestream reservation, an apparatus, a device, a medium and a product.

BACKGROUND

Livestream refers to a video that is produced in real time and started in real time. At present, a more common livestream scenario is that a streamer side client performs video collection on a streamer, and a user side client plays a video collected by the streamer side client. In some specific scenarios, in response that the streamer sets the livestreaming information and adds the livestream reservation sticker, the user may perform the livestream reservation in response to seeing the livestream reservation sticker.

It can be seen that the existing livestream reservation method is complex, resulting in a relatively low reservation efficiency and affecting the user experience.

SUMMARY

The embodiment of the present disclosure provides a livestream appointment method and device, equipment, a medium and a product.

According to a first aspect, an embodiment of the present disclosure provides a method for livestream reservation, including:

- displaying a reservation control on a livestreaming page of a current livestream of a target streamer before determining livestreaming information of a livestream to be started corresponding to the target streamer;
- in response to a trigger operation for the reservation control, reserving the livestream to be started of the target streamer.

According to a second aspect, an embodiment of the present disclosure provides an apparatus for livestream reservation, including:

- a control display unit, configured to display a reservation control on a livestreaming page of a current livestream of a target streamer before determining livestreaming information of a livestream to be started corresponding to the target streamer;
- an operation response unit, configured to, in response to a trigger operation for the reservation control, reserve the livestream to be started of the target streamer.

According to a third aspect, an embodiment of the present disclosure provides an electronic device, including a processor and a memory.

- the memory stores computer-executable instructions; and
- the computer-executable instructions stored in the memory, when executed by the processor, cause the at least one processor to execute the method for the livestream reservation according to the first aspect and various possible designs of the first aspect.

According to a fourth aspect, an embodiment of the present disclosure provides a computer readable storage medium, where the computer readable storage medium stores computer executable instructions, and the computer executable instruction, when executed by the processor, implement the method for livestream reservation according to the first aspect and various possible designs of the first aspect.

According to a fifth aspect, an embodiment of the present disclosure provides a computer program product, including a computer program, where the computer program, when executed by a processor, implements the method for livestream reservation according to the first aspect and various possible designs of the first aspect.

According to a sixth aspect, an embodiment of the present disclosure provides a computer program, where the computer program, when executed by a processor, implements the method livestream reservation method according to the first aspect and various possible designs of the first aspect.

BRIEF DESCRIPTION OF THE DRAWINGS

In order to more clearly illustrate the embodiments of the present disclosure or the technical solutions in the prior art, the accompanying drawings used in the description of the embodiments or the prior art will be briefly introduced below, and it will be apparent that the drawings in the following description are some embodiments of the present disclosure, and those skilled in the art may also obtain other drawings according to these drawings without creative labor.

DETAILED DESCRIPTION

Figure 1:
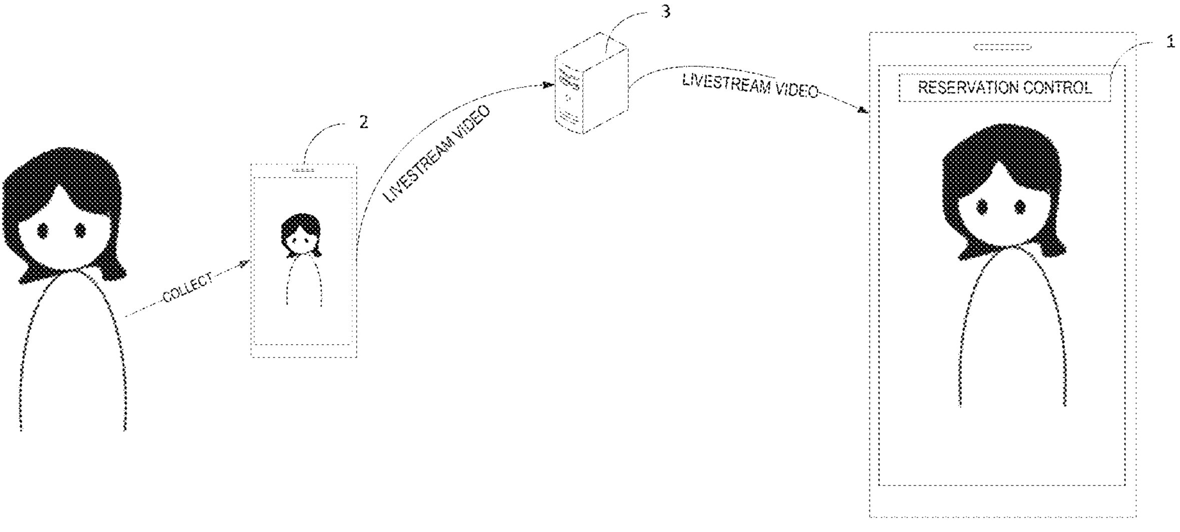
FIG. 1 is an application example diagram of a method for livestream reservation according to an embodiment of the present disclosure.

In order to make the objectives, technical solutions and advantages of the embodiments of the present disclosure clearer, the technical solutions in the embodiments of the present disclosure will be clearly and completely described below with reference to the accompanying drawings in the embodiments of the present disclosure. All other embodiments obtained by those skilled in the art based on the embodiments of the present disclosure without creative efforts shall fall within the scope of the present disclosure.

According to the technical scheme, the method can be applied to the livestream scenario, and the reservation control can be displayed on the current livestreaming page of the target streamer before the starting information of the livestream to be started corresponding to the target streamer is determined, so that the user can reserve the livestream to be started of the target streamer by triggering the reservation control. In this way, the user can conveniently perform the livestream reservation without predetermining and setting the livestreaming information of the livestream to be started, and the user does not need to add the livestream reservation sticker, thereby improving the livestream reservation efficiency and improving the user experience.

In the related art, in a livestream scenario, a streamer may start a livestream at any time, but a user interested in the streamer may not know that a livestream of the streamer or a livestream to be played of the streamer has been started, and may miss the livestream. It may also be due to the fact that the streamer does not set the livestream preview sticker for the livestream to be started or does not turn on the livestream preview/reservation function, so that the user may not reserve the livestream to be started of the streamer, and the viewing rate of the livestream is reduced In order to solve the above technical problem, in the embodiment of the present disclosure, considering that in the livestreaming process of the streamer, before the starting information of the livestream to be started corresponding to the target streamer is determined, the reservation control is displayed directly for the livestream to be started of the streamer. In this way, the user may be prompted to reserve the livestream to be played of the streamer, thereby improving the reservation efficiency.

The technical solutions of the present disclosure and how the technical solutions of the present disclosure solve the above technical problems will be described in detail below with reference to specific embodiments. The following specific embodiments may be combined with each other, and the same or similar concepts or processes may be omitted in some embodiments. Embodiments of the present disclosure will be described in detail below with reference to the accompanying drawings.

According to the technical solutions provided by the embodiment, a reservation control on a livestreaming page of a current livestream of a target streamer is displayed before determining livestreaming information of a livestream to be started corresponding to the target streamer; and in response to a trigger operation for the reservation control, the livestream to be started of the target streamer is reserved. In this way, the user can conveniently perform the livestream reservation without predetermining and setting the livestreaming information of the livestream to be started, and the user does not need to add the livestream reservation sticker, thereby improving the livestream reservation efficiency and improving the user experience.

FIG. 1 is an application example diagram of a method for livestream reservation according to the present disclosure. The application network architecture according to the embodiments of the present disclosure may include a first electronic device 1, a second electronic device 2, and a server 3. The first electronic device or the second electronic device may be a terminal device such as a mobile phone, a tablet computer, a personal computer, a smart home appliance, a wearable device, and the like, and a specific type of the client is not limited in this application. The server may be a server of a type such as a personal computer, a common server, a super personal computer, a cloud server and the like, and a specific type of the electronic device is not limited in the present disclosure.

The first electronic device may be an electronic device corresponding to a user viewing the livestream, and the second electronic device may be an electronic device corresponding to the host. During the livestreaming process, the second electronic device 2 may collect the live video of the streamer and send the live video to the server 3. The server 3 may push the live video to the user. The first electronic device 1 of the user may play the live video. In the real time process of capturing and playing live video, the reservation control 4 may be displayed on the livestream room page of the current livestream of the target streamer before determining the starting information of the livestream to be started corresponding to the target streamer, and prompt the reservation of the livestream of to be started of the target streamer. The first electronic device 1 may further reserve, in response to a trigger operation performed on the reservation control, the livestream to be started of the target streamer.

Figure 2:
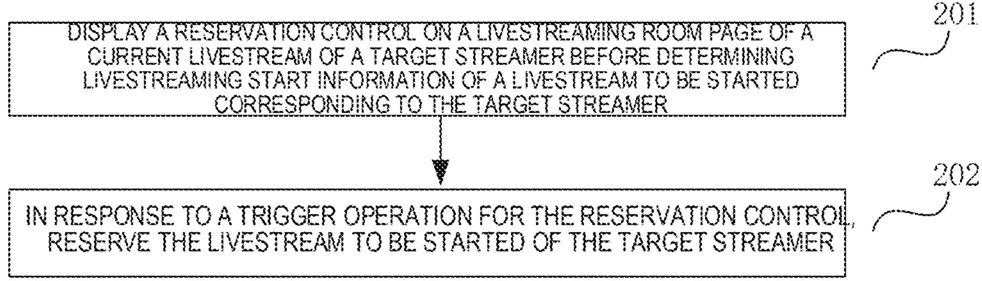
FIG. 2 is a flowchart of an embodiment of a method for livestream reservation according to an embodiment of the present disclosure.

Referring to FIG. 2, FIG. 2 is a flowchart of a method for livestream reservation according to an embodiment of the present disclosure.

201: displaying a reservation control on a livestreaming page of a current livestream of a target streamer before determining livestreaming information of a livestream to be started corresponding to the target streamer. As an example, the livestreaming page may include a livestreaming room page, and the livestreaming information may include livestreaming start information. Optionally, before the starting information of the livestream corresponding to the target streamer is determined, that is, the starting information of the livestream to be started is not determined temporarily, for example, the streamer does not set information such as the start time and the start topic of the livestream to be started in the livestream application.

The target streamer may be a streamer that is currently livestreaming, the livestreaming room of a current livestream may be a livestreaming room that is currently in the livestreaming state, that is, the livestreaming room in which the streamer is livestreaming, and the livestreaming page of the current livestream may be a livestreaming page corresponding to the livestreaming room that is currently in the livestream process.

The starting information is the starting information of the livestream to be started, and the starting information may specifically be a starting topic, a starting time, and the like. For example, the starting time may be "2:30-3:30", and the starting topic may be "price product recommendation".

Before the starting information of the livestream to be started of the target streamer is determined, a reservation control is already displayed on the current livestreaming page of the target streamer, and therefore, before the starting information of the livestream to be started is determined, the livestream to be started of the target streamer can be reserved through reservation control. The reservation control is configured to reserve a livestream to be started of the target streamer. The presentation of the reservation control is not determined based on the starting information of the livestream to be started, so that the user can conveniently perform the livestream reservation. Optionally, the reservation control may be displayed in the top left upper corner area or the upper right corner area of the livestreaming page, so as to avoid preventing the display of the livestreaming page, and realize accurate display of the reservation control and the livestreaming page.

According to the present disclosure, the reservation control is displayed on the current livestreaming page of the target streamer, and the reservation control can be a common function control in the livestreaming room of the livestream application, that is, the reservation control can be fixed on the livestreaming page.

202: in response to a trigger operation for the reservation control, reserving the livestream to be started of the target streamer.

Optionally, the reservation control may include a plurality of reservation states, and the plurality of reservation states may include an unreserved state and a reserved state. The reservation control is in an unreserved state, and the reservation control may display "reserve" for reservation prompt. The reservation control is in a reserved state, and the reservation control may display a reserved identification, for example, a tick identification "√". Of course, the description of the above two reservation states is merely exemplary and not limited thereto, in addition, the reservation control may display the prompt information for selecting a reservation corresponding to "reserve a livestream", and the reservation state may display the prompt information for cancelling a reservation corresponding to "cancel a reserved livestream".

Figure 3:
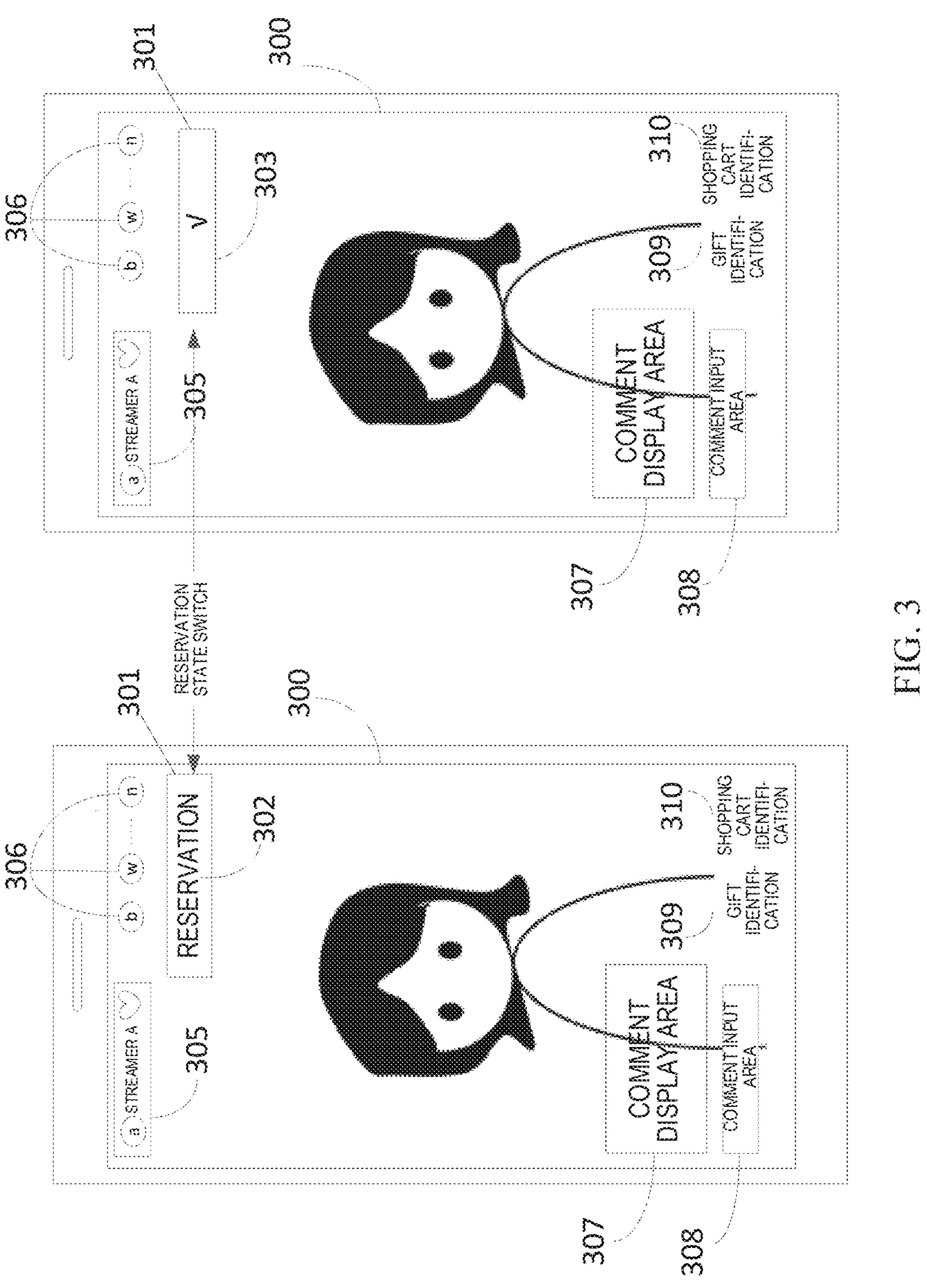
FIG. 3 is a display example diagram of a livestreaming page according to an embodiment of the present disclosure.

For ease of understanding, as shown in FIG. 3, the livestreaming page 300 may display a reservation control 301, the reservation control 301 may display a keyword 302 "reserve" in an unreserved state, and the reservation control 301 may display a tick identification 303 "√" in the reserved state. The reservation control 301 may switch between the keyword 302 "reserve" and the tick identification 303 "√" to achieve switching between different reservation states.

In addition, the livestreaming page 300 may also display other key elements of the livestreaming page. For example, a streamer identification 305 displayed on the top left side area, may include a profile identification, a nickname identification, a fan focus identification. For example, a user identification 306 displayed on the right side of the top may include a profile identification. For example, the livestreaming page 300 may also display a comment display area 307 located in a lower area in the page, a comment input area 308, a gift identification 309 displayed in parallel with the comment input area, and a shopping cart identification 310.

When the reservation control is in the reserved state, it indicates that the user has reserved the livestream to be played of the target streamer. Therefore, the reservation control can establish the reservation association between the target user and the livestream to be played, and the reservation efficiency is improved. When the reservation control is in the reserved state, the reservation control has been triggered, for example, clicking the reservation control may cancel the reservation of the livestream to be started of the target streamer. When the reservation control is in the unreserved state, it indicates that the user temporarily does not reserve the livestream to be started of the target streamer, at this time, the reservation control is triggered, for example, clicking the reservation control may reserve the livestream to be started of the target streamer.

The reservation control may perform a state switch between the unreserved state and the reserved state. The reservation control corresponding to the prompt information for selecting a reservation is triggered, and the reservation state of the livestream to be started of the target streamer triggered by the target user is the reserved state. The reservation control corresponding to the prompt information for cancelling a reservation is triggered, and the reservation state of t the livestream to be started of the target streamer triggered by the target user is an unreserved state.

In the embodiment of the present disclosure, before the information of the livestream to be started corresponding to the target streamer is determined, the reservation control can be displayed on the current livestreaming page of the target streamer, in response to the trigger operation on the reservation control, the livestream to be started of the target streamer can be reserved, through interaction with the reservation control, the reservation of the livestream to be started of the target streamer can be realized, and the efficiency of livestream reservation is effectively improved.

The livestream to be started in the present disclosure may include: a next livestream adjacent to the current livestream or all livestream to be played by the target streamer.

That is, in response that the starting information of the next livestream adjacent to the current livestream or the starting information of all the livestream to be started is unknown, the fast reservation of the next livestream or all livestream to be started may be implemented. The next livestream adjacent to the current livestream, that is, a livestream that is after the current livestream and the next livestream adjacent to the current livestream has not been started. All livestreams to be started may be all subsequent livestreams of the target streamer after the current livestream.

In one embodiment, all the livestream to be started of the target streamer can be reserved by triggering the reservation control, thereby enabling the user to quickly reserve all subsequent livestream of the target streamer, realizing the focus and viewing of the user for all the livestream to be started of the target streamer, and greatly improving the reservation efficiency.

In an embodiment of the present disclosure, the method further includes:

after the target streamer enables a livestream preview function and sets the livestreaming information corresponding to the livestream to be started, displaying a livestream preview sticker on the livestreaming page of the current livestream, wherein the livestream preview sticker comprises a reservation identification and the livestreaming information. Certainly, in actual application, the livestream preview sticker may further include other information, for example, information such as a picture and a video related to the livestream content, and this solution is merely exemplary, and should not constitute a limitation on the technical solution.

The streamer may set the livestream preview for the livestream to be started, and may specifically set the starting information, such as the starting time, the starting topic, in the starting information setting page. The starting information setting page may further display a switch button for a livestream preview function, the switch button may enable or disable the livestream preview function. In response that the switch button is enable, the livestream preview function is enabled.

After the starting information is set and the livestream preview function is enabled through the starting information setting page, in the current livestream process of the target streamer, the livestream preview sticker may be displayed in the livestreaming room of the current livestream. The starting information, such as the starting time and the starting topic, can be displayed in the livestream preview sticker.

Optionally, the livestream preview sticker may include a livestream preview pop-up window, a livestream preview sub-page in the livestreaming page, and the like. The livestream preview sticker may display the reservation identification and the starting information. The starting information may include a starting time, a starting topic, and the like. The livestream preview sticker may be displayed at a different location from the reservation control in the display interface of the livestreaming room.

In this case, the user can conveniently obtain reservation prompt for the livestream to be started in time through the double prompt of the reservation identification in the livestream preview sticker and the reservation control, thereby reserving the livestream to be started.

Figure 4:
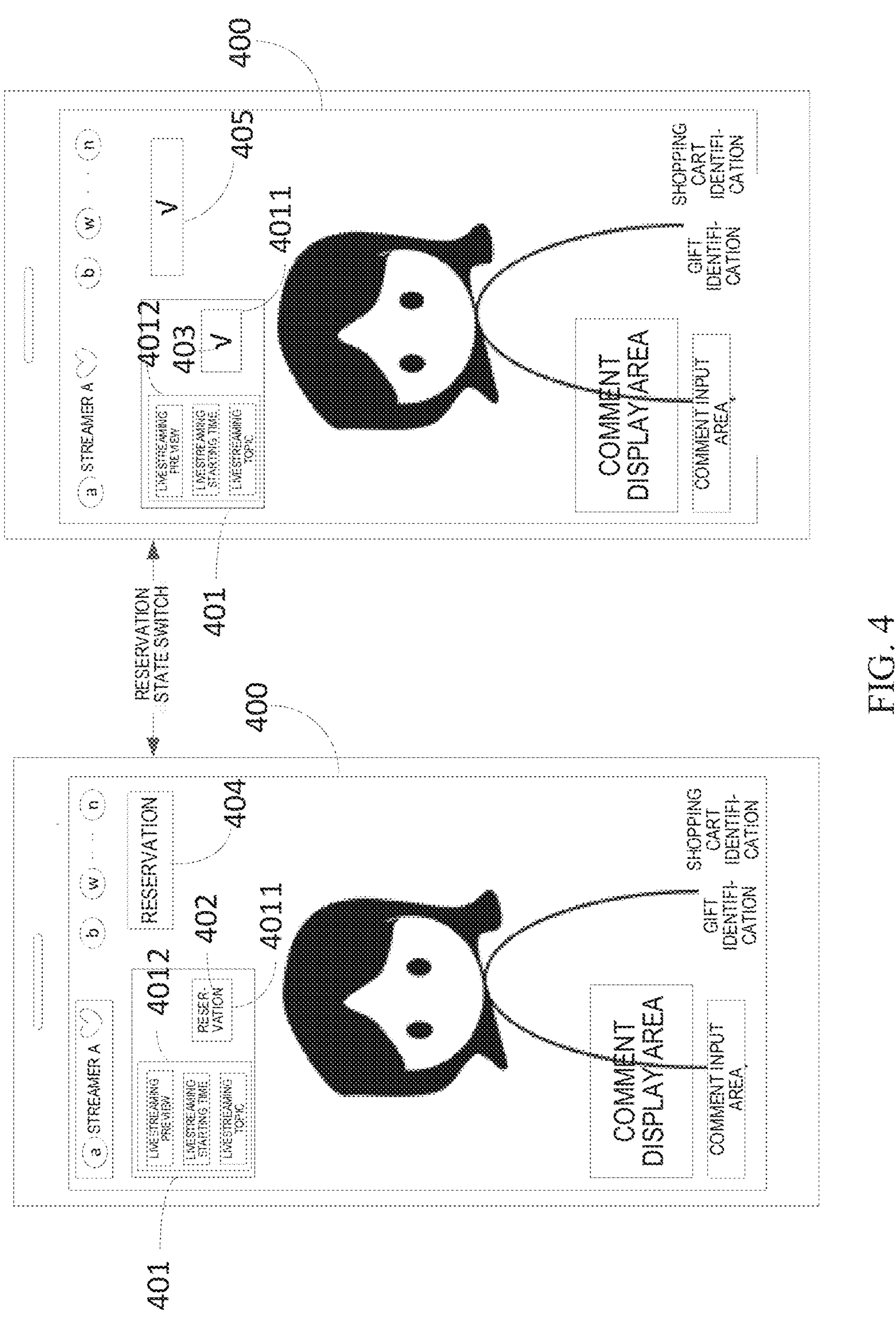
FIG. 4 is another display example diagram of a livestreaming page according to an embodiment of the present disclosure.

For ease of understanding, as shown in FIG. 4, FIG. 4 is an example diagram of a livestream preview sticker 401 displayed on a livestreaming page 400 according to an embodiment of the present disclosure. The display state of the reservation identification 4011 in the livestream preview sticker 401 may be switched, referring to FIG. 4, in the unreserved state, the reservation identification 4011 may be an identification 402 "reserve", and in the reserved state, the reservation identification 4012 may be the tick identification 403 "√". In the reservation state switching process, the display state of the reservation identification may be synchronously switched with the reservation state.

In addition, a reservation control 404 may also be displayed in the livestreaming page 400 at the same time, the reservation control 404 may display "reserve" in an unreserved state, and display "reserved" and the tick identification 405 "√" in the reserved state. In addition, the livestreaming page may further display other key elements of the livestreaming page. For example, a streamer identification displayed in the top left side area may include a profile identification, a nickname identification, and a livestreaming room audience identification displayed on the right side of the top may include a profile identification. The livestreaming page may further display a comment display area located in a lower area in the page, a comment input area, a gift identification displayed in parallel to the comment input area, and a shopping cart identification. For identifications of elements, refer to FIG. 3.

It should be noted that the livestreaming page shown in each example diagram of the present disclosure is merely exemplary, and should not constitute a specific limitation on the display form of the livestreaming page, and the technical solutions of superimposing the livestreaming room on each display form belong to the protection scope of the present disclosure.

In a possible design, the method further includes:

in response to a trigger operation for the reservation identification, reserving the livestream to be started corresponding to the livestreaming information;

canceling display of the livestream preview sticker, and maintaining display of the reservation control on the livestreaming page.

The function and the processing manner of the reservation identification may be similar to the reservation control, and the specific execution steps are not described herein again.

The reservation identification may display prompt information for selecting a reservation of "reserve a livestream" and prompt information for canceling a reservation of "cancel a reserved livestream".

Canceling the display of the livestream preview sticker may include: turning off the livestream preview sticker in the livestreaming page, that is, not displaying the livestream preview sticker on the livestreaming page, because the information displayed on the livestreaming preview sticker is relatively large, and the size of the sticker is relatively large. In response to the trigger operation performed on the reservation identification, the livestream to be started corresponding to the starting information is reserved, and he display of the livestream preview sticker is canceled, thereby avoiding excessive shielding of the image.

Certainly, the reservation control is maintained in the livestream room page, because the size of the reservation control is relatively small, and the reservation control is continuously fixed and displayed as the resident function of the livestream room, so that the user can conveniently reserve or cancel the reservation, and the user experience is improved.

In another embodiment, the livestream to be started corresponding to the starting information is the next livestream adjacent to the current livestream; the method further includes:

in response to the trigger operation for the reservation control, synchronously adjusting display states of the reservation control and the reservation identification.

Optionally, the display states of the reservation control and the reservation identification may also be synchronously adjusted in response to the trigger operation for the reservation identification.

The reservation identification and the reservation state corresponding to the reservation control may be synchronized, that is, when the user triggers any one of the reservation identification or the reservation control, the reservation identification and the reservation state of the reservation control may be simultaneously switched. The reservation state may include a reserved state and an unreserved state.

The display state may correspond to the reservation state, and may include a first display state corresponding to the reserved state and a second display state corresponding to the unreserved state. The first display state may specifically include prompt information corresponding to "reserved", and the second display state may specifically include prompt information corresponding to "reserve a livestream to be started".

The reservation identification or reservation control may switch between the reserved state and the unreserved state. The switching of the reservation state may trigger switching of the display state. For example, the reservation state is switched to the reserved state, the display state may be switched to the first display state, the reservation state is switched to the unreserved state, and the display state may be switched to the second display state.

In the embodiments of the present disclosure, after the user performs the trigger operation on the reservation control, the reservation control and the display state of the reservation identification may be synchronously adjusted. By synchronously adjusting the reservation control and the display states of the reservation identification, the synchronization information control of the reservation control and the reservation identification can be realized, the disorder of the livestream reservations caused by triggering the reservation control or the reservation identification is avoided, and the livestream reservation efficiency and accuracy are improved.

Figure 5:
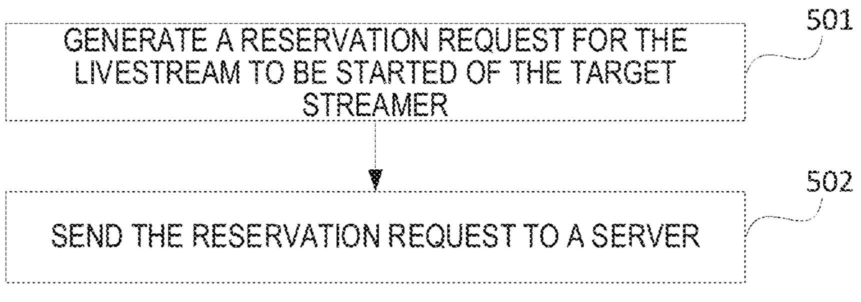
FIG. 5 is another schematic flowchart of a method for livestream reservation according to an embodiment of the present disclosure.

FIG. 5 is a flowchart of another embodiment of a method for livestream reservation according to an embodiment of the present disclosure.

501: generating a reservation request for the livestream to be started of the target streamer.

502: sending the reservation request to a server, wherein the reservation request is configured to obtain a livestreaming start reminder of the livestream to be started of the target streamer, and establish a reservation association between a target user and the livestream to be started of the target streamer.

The reservation request may be obtained by triggering, by the first electronic device, a reservation control in a play page for the live video when the target user views the livestream. The reservation control may be a reservation prompt control of the livestream to be played for the target user. The first electronic device may detect a trigger operation performed by the target user for the reservation control in response to playing the live video.

The reservation request may also be generated according to the reservation identification, and if the reservation identification prompt is in the unreserved state, the reservation request may be generated by detecting that the target user triggers the reservation identification to reserve the livestream to be started.

Figure 6:
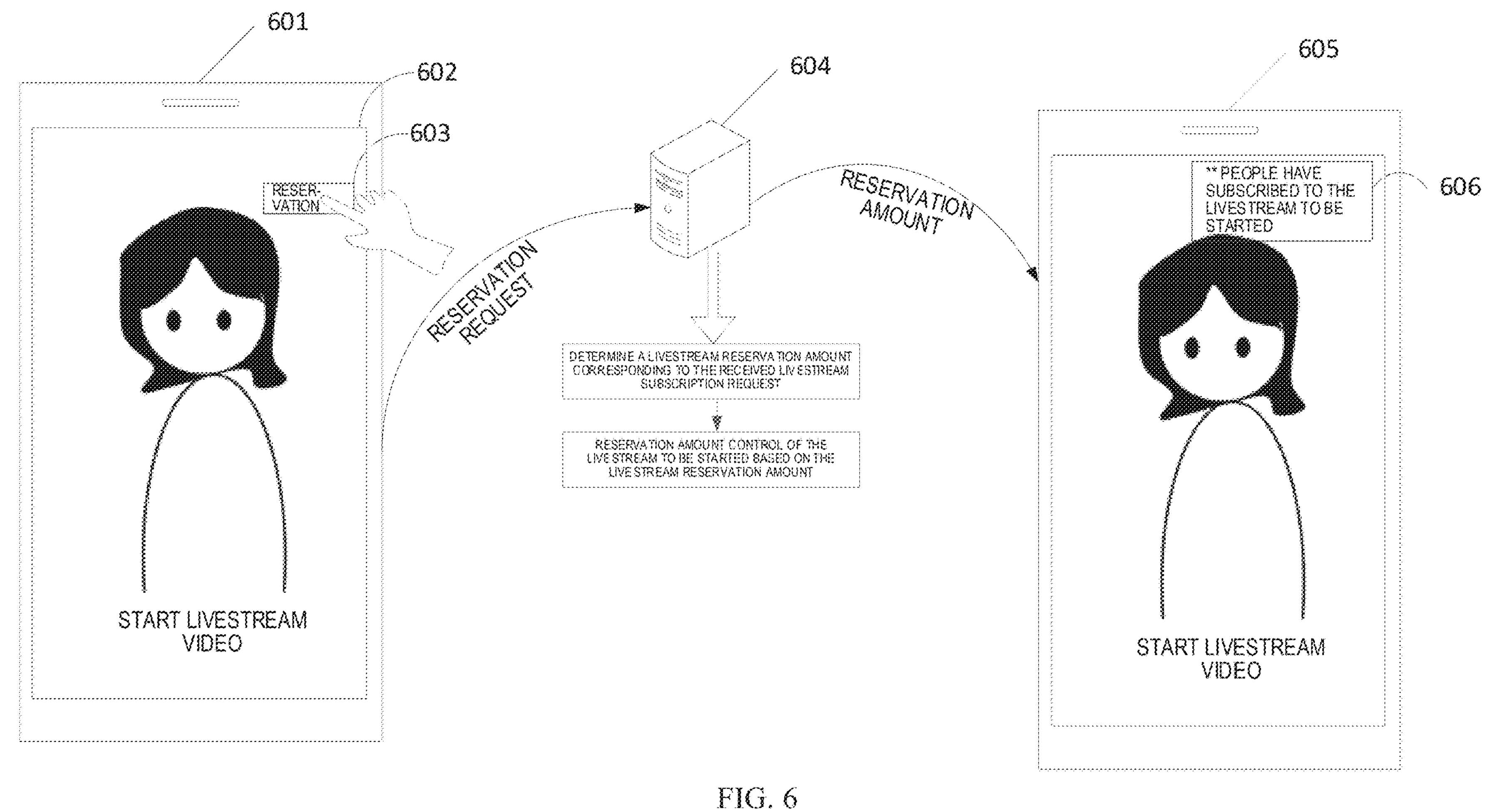
FIG. 6 is a page example diagram of displaying a live video according to an embodiment of the present disclosure.

As shown in FIG. 6, the first electronic device 601 may display a live video playing page 602, referred to as a livestreaming page of the livestreaming room, and the live streaming room page 602 may display a real-time picture of the live streaming video. In addition, a reservation control 603 may also be displayed in the livestreaming page 602. In response that the first electronic device 601 detects that the reservation control is triggered by 603, a reservation request may be generated, and the reservation request is sent to the server 604. The server 604 may receive a reservation request. Therefore, the server 604 may determine the livestream reservation amount corresponding to the received reservation request. Based on the livestream reservation amount, the reservation amount control of the livestream to be started is determined, the reservation amount control is sent to the second electronic device 605 of the streamer, the second electronic device 605 may display the real-time picture of the livestreaming room video, the second electronic device 605 may additionally display the reservation amount control 606, and the reservation amount control 606 may include, for example, prompt information such as "There are already * * people to reserve livestream to be started", to prompt the reservation amount. The reservation amount control may be displayed through the reservation amount control. Certainly, other key elements of the livestreaming page may also be displayed in the livestreaming page, for example, an streamer identification, a user identification, and the like displayed in the top left side area, which may be specifically referred to FIG. 3, and details are not described herein again.

In the embodiment of the present disclosure, the reservation control can be displayed on the livestream room page. By detecting the trigger operation executed by the target user for the reservation control, the reservation request can be generated, the livestream reservation amount can be determined through the reservation request, the target streamer is displayed through the livestream reservation amount, and the accurate prompt of the reservation amount is realized.

In a possible design, after reserving the livestream to be started of the target streamer, the method further includes:

receiving a livestreaming start reminder of the livestream to be started of the target streamer, wherein the livestreaming start reminder is prompt information determined according to that the target streamer starts the livestream to be started;

displaying the livestreaming start reminder to prompt viewing the livestream to be started.

Optionally, the livestreaming start reminder may be prompt information generated in response that the target streamer ends the current livestream and plays the livestream to be started.

The livestreaming start reminder may be displayed in a form of a pop-up window, a sub-page, an instant messaging message, or the like. The livestreaming start reminder may be, for example, prompt information such as "Streamer A that you focuses has started livestream".

In the embodiment of the present disclosure, the livestreaming start reminder information can be sent through the server to prompt the streamer to start the livestream to be started, and the prompt efficiency of the livestream is improved.

In a possible design, the livestreaming start reminder information includes starting prompt pop-up window; and the display of livestreaming start reminder information includes:

presenting starting the prompt pop-up window at the top of the display page.

In the embodiment of the present disclosure, the prompt pop-up window is displayed at the top of the display page, and the prompt efficiency of starting the prompt pop-up window is improved.

In an embodiment, the target streamer may receive a start reminder, and further includes:

receiving start reminder information, wherein the start reminder information is generated in response that the server detects that the streamer does not start the livestream on the basis of the starting time determined by the end time of the current livestream.

displaying the start reminder information on the display page of the target streamer to prompt the target streamer to start the livestream to be started.

In the embodiment of the present disclosure, the start reminder information can be received, the start reminder information is displayed on the display page of the target streamer, the target streamer is prompted to start the livestream to be started, the starting prompt of the target streamer is realized, and the livestream starting rate is improved.

In one embodiment, the method further comprises:

in response to a setting operation performed by the target streamer for the livestream preview function, obtaining the starting information of the livestream to be started provided by the target streamer.

determining a livestream preview sticker corresponding to the starting information of the livestream to be started, where the livestream preview sticker is used to display on the livestreaming page, and the livestream preview sticker includes the starting information.

According to the embodiment of the present disclosure, the starting information corresponding to the livestream to be started provided by the target streamer through the livestream preview function can be effectively prompted.

Figure 7:
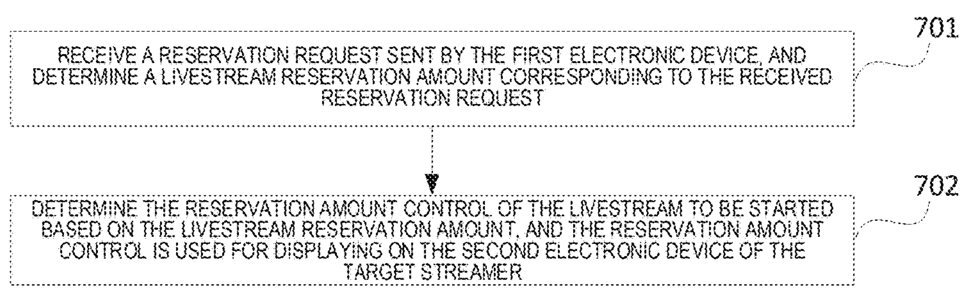
FIG. 7 is a flowchart of still another embodiment of a method for livestream reservation according to an embodiment of the present disclosure.

As an embodiment, as shown in FIG. 7, FIG. 7 is a flowchart of another embodiment of a method for livestream reservation according to the present disclosure.

701: receiving a reservation request sent by the first electronic device, and determining a livestream reservation amount corresponding to the received reservation request; and the reservation request being generated by a trigger operation performed by the target user for the reservation control of the livestream to be started.

702: determining the reservation amount control of the livestream to be started based on the livestream reservation amount, and the reservation amount control is used for displaying on the second electronic device of the target streamer.

In the embodiment of the present disclosure, the server can determine the livestream reservation amount corresponding to the received reservation request according to the reservation request sent by the first electronic device, so as to determine the reservation amount control corresponding to the livestream reservation amount, prompt the target streamer through the reservation amount control, and realize the reservation prompt efficiency of the next livestream.

In one embodiment, the method further includes:

in response that the livestream of the target streamer ends, recording the end time of the livestream;

determining a starting time of the livestream to be started based on the end time;

in response that the target streamer does not start the livestream to be started at the starting time, generating start reminder information of the livestream to be started;

sending start reminder information to the second electronic device, where the start reminder information indicates the second electronic device to display, so as to prompt the target streamer to start the livestream to be played.

The determining, based on the end time, the starting time of the livestream to be started may include: obtaining a livestream interval duration, calculating a sum of the end time and the livestream interval duration, and obtaining the starting time of the livestream to be started.

The livestream interval may be an average interval time corresponding to multiple historical livestreams of the target streamer.

Optionally, the start reminder information may be prompted in an information form such as a short message, an instant messaging message, a pop-up window, a scroll bar and the like, and the streamer user may be accurately prompted by using a short message and an instant messaging message, so that a message omission may be avoided. The pop-up window or the scroll bar can prompt the streamer user in real time, and the information prompt efficiency can be effectively improved.

In the embodiment of the present disclosure, the starting time of the livestream to be played can be determined based on the end time of the livestream, and in response that the target streamer does not start the livestream at the starting time of the livestream to be started, the start reminder information can be generated, the second electronic device is prompted by starting the reminder information, the livestream starting efficiency of the target streamer is improved, and the purpose of improving the livestream viewing efficiency is achieved through the effective prompt.

In some embodiments, the method further includes:

In response to detecting that the target streamer starts the next livestream adjacent to the current livestream, determining the start reminder information of the next livestream;

sending the start reminder information to the first electronic device of the target user that has reserved the next livestream, where the start reminder information indicates that the next livestream has been started.

The livestream to be started may be the next livestream adjacent to the current livestream.

The broadcast reminder information may prompt that the target next livestream has been started. The target prompt information may be sent to the first electronic device in a form of an instant messaging message, a short message, or the like.

In a possible design, the start reminder information includes: a starting prompt pop-up window.

The starting prompt pop-up window may be pushed to the first electronic device by the server. The first electronic device may display the starting prompt pop-up window, and may specifically display the starting prompt pop-up window at the top of the display page, so as to avoid affecting the current browsing content of the target user and improve the user experience. The starting prompt pop-up window is used as the start reminder information, the starting prompt generation of the livestream information of the next livestream is realized, and the prompt efficiency of the information is improved.

In the embodiment of the present disclosure, when the target streamer starts the next livestream, the broadcast reminding information of the next livestream can be generated, the starting reminder information is sent to the first electronic device of the target user, the next livestream of the target streamer can be indicated to be started through the starting reminder information, the starting prompt of the next livestream is realized, the prompting efficiency is improved, and the targeted prompt of the next livestream is realized.

Figure 8:
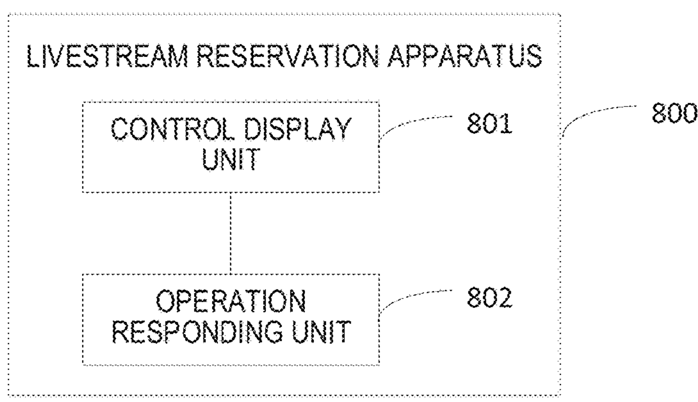
FIG. 8 is a schematic structural diagram of an apparatus for livestream reservation according to an embodiment of the present disclosure.

As shown in FIG. 8, FIG. 8 is a schematic structural diagram of an embodiment of an apparatus for livestream reservation according to an embodiment of the present disclosure. The livestream reservation apparatus 800 may include:

a control display unit 801, configured to display a reservation control on a livestreaming page of a current livestream of a target streamer before determining livestreaming information of a livestream to be started corresponding to the target streamer;

an operation response unit 802, configured to, in response to a trigger operation for the reservation control, reserve the livestream to be started of the target streamer.

In one embodiment, the livestream to be started comprises a next livestream adjacent to the current livestream or all livestreams to be started of the target streamer.

In another embodiment, the apparatus further includes:

the livestream preview unit, configured to, after the target streamer enables a livestream preview function and sets the livestreaming information corresponding to the livestream to be started, display a livestream preview sticker on the livestreaming page of the current livestream, where the livestream preview sticker comprises a reservation identification and the livestreaming information.

In some embodiments, the apparatus further includes:

a first trigger unit, configured to, in response to a trigger operation for the reservation identification, reserve the livestream to be started corresponding to the livestreaming information;

a display cancellation unit, configured to cancel display of the livestream preview sticker, and maintaining display of the reservation control on the livestreaming page.

In some embodiments, the livestream to be started corresponding to the starting information is the next livestream adjacent to the current livestream.

A reservation response unit is configured to, in response to the trigger operation for the reservation control, synchronously adjust display states of the reservation control and the reservation identification.

In another embodiment, the operation response unit includes:

a request generation module, configured to a reservation request for the livestream to be started of the target streamer;

a request sending module, configured to the reservation request to a server, wherein the reservation request is configured to obtain a livestreaming start reminder of the livestream to be started of the target streamer, and establish a reservation association between a target user and the livestream to be started of the target streamer.

In another embodiment, the apparatus further includes:

a reminder receiving unit, configured to receive a livestreaming start reminder of the livestream to be started of the target streamer, wherein the livestreaming start reminder is prompt information determined according to that the target streamer starts the livestream to be started;

a broadcast reminder unit, configured to display the livestreaming start reminder to prompt viewing the livestream to be started.

The apparatus provided in this embodiment may be configured to perform the technical solutions in the foregoing method embodiments, and implementation principles and technical effects thereof are similar, and details are not described herein again in this embodiment.

In order to achieve the above embodiments, an embodiment of the present disclosure further provides an electronic device.

Figure 9:
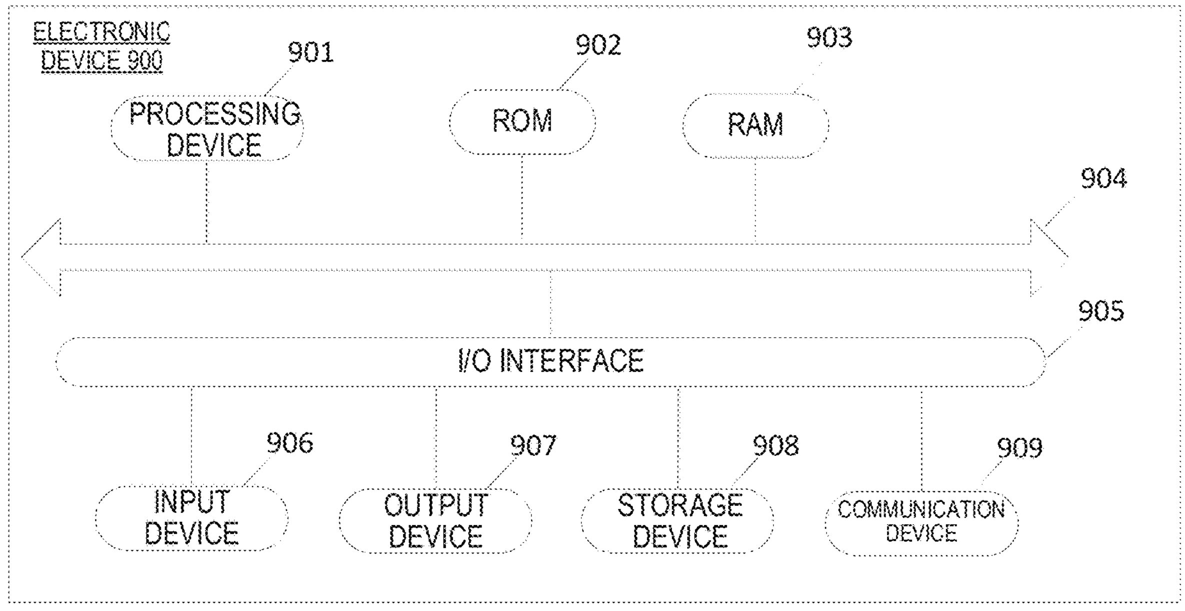
FIG. 9 is a schematic diagram of a hardware structure of an electronic device according to an embodiment of the present disclosure.

FIG. 9 shows a schematic structural diagram of an electronic device 900 suitable for implementing embodiments of the present disclosure, and the electronic device 900 may be a terminal device or a server. The terminal device may include, but is not limited to, a mobile terminal such as a mobile phone, a notebook computer, a digital broadcast receiver, a personal digital assistant (PDA), a tablet computer (PAD), a portable multimedia player (PMP), an in-vehicle terminal (for example, an in-vehicle navigation terminal), and a fixed terminal such as a digital TV, a desktop computer, or the like. The electronic device shown in FIG. 9 is merely an example, and should not impose any limitation on the functions and scope of use of the embodiments of the present disclosure.

As shown in FIG. 9, the electronic device 900 may include a processing device (for example, a central processing unit, a graphics processor, etc.) 901, which may perform various appropriate actions and processing according to a program stored in a read only memory (ROM) 902 or a program loaded into a random access memory (RAM) 903 from a storage device 908. In the RAM 903, various programs and data required by the operation of the electronic device 900 are also stored. The processing device 901, the ROM 902, and the RAM 903 are connected to each other through a bus 904. An input/output (I/O) interface 905 is also connected to the bus 904.

Generally, the following devices may be connected to the I/O interface 905: an input device 906 including, for example, a touch screen, a touch pad, a keyboard, a mouse, a camera, a microphone, an accelerometer, a gyroscope, etc.; an output device 907 including, for example, a liquid crystal display (LCD), a speaker, a vibrator, etc.; a storage device 908 including, for example, a magnetic tape, a hard disk, etc.; and a communication device 909. The communication device 909 may allow the electronic device 900 to communicate wirelessly or wired with other devices to exchange data. While FIG. 9 shows an electronic device 900 having various devices, it should be understood that it is not required to implement or have all illustrated devices. More or fewer devices may alternatively be implemented or provided.

In particular, according to an embodiment of the present disclosure, the process described above with reference to the flowchart may be implemented as a computer software program. For example, embodiments of the present disclosure include a computer program product comprising a computer program embodied on a computer readable medium, the computer program comprising program code for performing the method shown in the flowchart. In such embodiments, the computer program may be downloaded and installed from the network through the communication device 909, or installed from the storage device 908, or from the ROM 902. When the computer program is executed by the processing apparatus 901, the foregoing functions defined in the method of the embodiments of the present disclosure are performed.

It should be noted that the computer-readable medium described above may be a computer readable signal medium, a computer readable storage medium, or any combination of the foregoing two. The computer-readable storage medium may be, for example, but not limited to, an electrical, magnetic, optical, electromagnetic, infrared, or semiconductor system, device, or device, or any combination thereof. More specific examples of the computer-readable storage medium may include, but are not limited to, an electrical connection having one or more wires, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination thereof. In the present disclosure, a computer-readable storage medium may be any tangible medium containing or storing a program that may be used by or in connection with an instruction execution system, apparatus, or device. In the present disclosure, a computer readable signal medium may include a data signal propagated in baseband or as part of a carrier, where the computer readable program code is carried. Such propagated data signals may take a variety of forms including, but not limited to, electromagnetic signals, optical signals, or any suitable combination of the foregoing. The computer readable signal medium may also be any computer readable medium other than a computer readable storage medium that may send, propagate, or transmit a program for use by or in connection with an instruction execution system, apparatus, or device. The program code embodied on the computer-readable medium may be transmitted with any suitable medium, including, but not limited to: wires, optical cables, RF (radio frequency), and the like, or any suitable combination of the foregoing.

The computer-readable medium described above may be included in the electronic device; or may be separately present without being assembled into the electronic device.

The computer-readable medium carries one or more programs, and when the one or more programs are executed by the electronic device, the electronic device is enabled to perform the method shown in the foregoing embodiments.

Computer program code for performing the operations of the present disclosure may be written in one or more programming languages, including object oriented programming languages, such as Java, Smalltalk, C++, and conventional procedural programming languages, such as the "C" language or similar programming languages. The program code may execute entirely on a user computer, partially on a user computer, as a stand-alone software package, partially on a user computer, partially on a remote computer, or entirely on a remote computer or server. In the case of a remote computer, the remote computer may be connected to the user computer through any kind of network, including a local area network (LAN) or a wide area network (WAN), or may be connected to an external computer (for example, using an Internet service provider for Internet connection).

The flowcharts and block diagrams in the figures illustrate architecture, functionality, and operation of possible implementations of systems, methods, and computer program products according to various embodiments of the present disclosure. In this regard, each block in the flowchart or block diagram may represent a module, program segment, or portion of code that includes one or more executable instructions for implementing the specified logical function. It should also be noted that in some alternative implementations, the functions noted in the blocks may also occur in a different order than that illustrated in the figures. For example, two consecutively represented blocks may actually be performed substantially in parallel, which may sometimes be performed in the reverse order, depending on the functionality involved. It is also noted that each block in the block diagrams and/or flowcharts, as well as combinations of blocks in the block diagrams and/or flowcharts, may be implemented with a dedicated hardware-based system that performs the specified functions or operations, or may be implemented in a combination of dedicated hardware and computer instructions.

The units involved in the embodiments of the present disclosure may be implemented in software, or may be implemented in hardware. For example, the first obtaining unit may be further described as "obtaining at least two units of Internet Protocol addresses".

The functions described above may be performed, at least in part, by one or more hardware logic components. For example, without limitation, the exemplary types of hardware logic components that may be used include: a field programmable gate array (FPGA), an application specific integrated circuit (ASIC for short), an application specific standard (ASSP), a system on chip (SoC for short), a complex programmable logic device (Complex Programmable Logic Device, CPLD for short), and the like.

In the context of the present disclosure, a machine-readable medium may be a tangible medium that may contain or store a program for use by or in connection with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, devices, or devices, or any suitable combination of the foregoing. More specific examples of machine-readable storage media may include electrical connections based on one or more lines, portable computer disks, hard disks, random access memory (RAM), read-only memory (ROM), erasable programmable read-only memory (EPROM or Flash memory), optical fibers, portable compact disc read-only memory (CD-ROM), optical storage devices, magnetic storage devices, or any suitable combination of the foregoing.

According to a first aspect, a method for livestream reservation is provided according to one or more embodiments of the present disclosure, including:

displaying a reservation control on a livestreaming page of a current livestream of a target streamer before determining livestreaming information of a livestream to be started corresponding to the target streamer; and in response to a trigger operation for the reservation control, reserving the livestream to be started of the target streamer.

According to one or more embodiments of the present disclosure, the livestream to be started comprises a next livestream adjacent to the current livestream or all livestreams to be started of the target streamer.

According to one or more embodiments of the present disclosure, the method further includes:

displaying a livestream preview sticker on the livestreaming page of the current livestream, wherein the livestream preview sticker comprises a reservation identification and the livestreaming information.

According to one or more embodiments of the present disclosure, the method further includes:

in response to a trigger operation for the reservation identification, reserving the livestream to be started corresponding to the livestreaming information;

canceling display of the livestream preview sticker, and maintaining display of the reservation control on the livestreaming page.

According to one or more embodiments of the present disclosure, the livestream to be started corresponding to the starting information is the next livestream adjacent to the current livestream.

In response to the trigger operation for the reservation control, display states of the reservation control and the reservation identification is synchronously adjusted.

According to one or more embodiments of the present disclosure, reserving the livestream to be started of the target streamer includes:

generating a reservation request for the livestream to be started of the target streamer;

sending the reservation request to a server, wherein the reservation request is configured to obtain a livestreaming start reminder of the livestream to be started of the target streamer, and establish a reservation association between a target user and the livestream to be started of the target streamer.

According to one or more embodiments of the present disclosure, the method further includes:

receiving a livestreaming start reminder of the livestream to be started of the target streamer, wherein the livestreaming start reminder is prompt information determined according to that the target streamer starts the livestream to be started;

displaying the livestreaming start reminder to prompt viewing the livestream to be started.

According to a second aspect, an apparatus for livestream reservation is provided according to one or more embodiments of the present disclosure, including:

a control display unit, configured to display a reservation control on a livestreaming page of a current livestream of a target streamer before determining livestreaming information of a livestream to be started corresponding to the target streamer;

an operation response unit, configured to, in response to a trigger operation for the reservation control, reserve the livestream to be started of the target streamer.

According to a third aspect, an electronic device is provided according to one or more embodiments of the present disclosure, including: at least one processor and a memory;

the memory store computer executable instructions;

the computer-executable instructions stored in the memory, when executed by the processor, cause the at least one processor to execute the method for livestream reservation according to the first aspect and various possible designs of the first aspect.

According to a fourth aspect, a computer readable storage medium is provided according to one or more embodiments of the present disclosure, the computer-readable storage medium stores computer-executable instructions, and the computer-executable instructions, when executed by the processor, implement the method for livestream reservation according to the first aspect and various possible designs of the first aspect is implemented.

According to a fifth aspect, a computer program product is provided according to one or more embodiments of the present disclosure, including a computer program, where the computer program, when executed by a processor, implements the method for livestream reservation according to the first aspect and various possible designs of the first aspect.

According to a sixth aspect, an embodiment of the present disclosure provides a computer program, where the computer program, when executed by a processor, implements the method for livestream reservation according to the first aspect and various possible designs of the first aspect.

The above description is merely an illustration of the preferred embodiments of the present disclosure and the principles of the application. It should be understood by those skilled in the art that the disclosure in the present disclosure is not limited to the technical solutions of the specific combination of the above technical features, and should also cover other technical solutions formed by any combination of the above technical features or their equivalent features without departing from the above disclosed concept. For example, the above features are the technical solutions formed by mutually replacing technical features disclosed in the present disclosure (but not limited to).

Further, while operations are depicted in a particular order, this should not be understood to require that these operations be performed in the particular order shown or in sequential order. In certain circumstances, multitasking and parallel processing may be advantageous. Likewise, while several specific implementation details are included in the discussion above, these should not be construed as limiting the scope of the present disclosure. Certain features described in the context of separate embodiments may also be implemented in combination in a single embodiment. Conversely, the various features described in the context of a single embodiment may also be implemented in multiple embodiments either individually or in any suitable subcombination.

Although the present subject matter has been described in language specific to structural features and/or methodological acts, it is to be understood that the subject matter defined in the appended claims is not necessarily limited to the specific features or acts described above. Rather, the specific features and acts described above are merely exemplary forms of implementing the claims.

We claim:

1. A method for livestream reservation, comprising:

displaying a reservation control on a livestreaming page of a first livestream of a streamer before determining livestreaming information of a second livestream to be started corresponding to the streamer;

displaying a livestream preview element on the livestreaming page of the first livestream, wherein the livestream preview element comprises at least a reservation identification; and in response to a trigger operation for the reservation control or the reservation identification, reserving the second livestream of the streamer.

2. The method of claim 1, wherein the second livestream comprises a next livestream adjacent to the first livestream or all livestreams to be started of the streamer.

3. The method of claim 1, wherein displaying the livestream preview element comprises:

based on a livestream preview function being enabled and the livestreaming information of the second livestream being configured, displaying the livestream preview element on the livestreaming page of the first livestream, wherein the livestream preview element further comprises the livestreaming information.

4. The method of claim 1, further comprising:

canceling display of the livestream preview element, and maintaining display of the reservation control on the livestreaming page.

5. The method of claim 1, further comprising:

in response to the trigger operation for the reservation control or the reservation identification, synchronously adjusting display states of the reservation control and the reservation identification.

6. The method of claim 1, wherein reserving the second livestream of the streamer comprises:

generating a reservation request for the second livestream of the streamer; and sending the reservation request to a server, wherein the reservation request is configured to obtain a livestreaming start reminder of the second livestream of the streamer, and establish a reservation association between a user and the second livestream of the streamer.

7. The method of claim 1, further comprising:

receiving a livestreaming start reminder of the second livestream of the streamer, wherein the livestreaming start reminder is prompt information determined according to that the streamer starts the second livestream; and displaying the livestreaming start reminder to prompt viewing the second livestream.

8. An electronic device, comprising: a processor, a memory, and an output device; wherein the output device is configured to output a video or information;

the memory stores computer-executable instructions; and the computer-executable instructions stored in the memory, when executed by the processor, cause the processor to perform acts comprising:

displaying a reservation control on a livestreaming page of a first livestream of a streamer before determining livestreaming information of a second livestream to be started corresponding to the streamer;

displaying a livestream preview element on the livestreaming page of the first livestream, wherein the livestream preview element comprises at least a reservation identification; and in response to a trigger operation for the reservation control or the reservation identification, reserving the second livestream of the streamer.

9. The electronic device of claim 8, wherein the second livestream comprises a next livestream adjacent to the first livestream or all livestreams to be started of the streamer.

10. The electronic device of claim 8, wherein displaying the livestream preview element comprises:

based on a livestream preview function being enabled and the livestreaming information of the second livestream being configured, displaying the livestream preview element on the livestreaming page of the first livestream, wherein the livestream preview element further comprises the livestreaming information.

11. The electronic device of claim 8, wherein the acts further comprise:

canceling display of the livestream preview element, and maintaining display of the reservation control on the livestreaming page.

12. The electronic device of claim 8, wherein the acts further comprise:

in response to the trigger operation for the reservation control or the reservation identification, synchronously adjusting display states of the reservation control and the reservation identification.

13. The electronic device of claim 8, wherein reserving the second livestream of the streamer comprises:

generating a reservation request for the second livestream of the streamer; and sending the reservation request to a server, wherein the reservation request is configured to obtain a livestreaming start reminder of the second livestream of the streamer, and establish a reservation association between a user and the second livestream of the streamer.

14. The electronic device of claim 8, wherein the acts further comprise:

receiving a livestreaming start reminder of the second livestream of the streamer, wherein the livestreaming start reminder is prompt information determined according to that the streamer starts the second livestream; and displaying the livestreaming start reminder to prompt viewing the second livestream.

15. A non-transitory computer-readable storage medium, wherein the computer-readable storage medium stores computer-executable instructions, and the computer-executable instructions, when executed by the processor, implement acts comprising:

displaying a reservation control on a livestreaming page of a first livestream of a streamer before determining livestreaming information of a second livestream to be started corresponding to the streamer;

displaying a livestream preview element on the livestreaming page of the first livestream, wherein the livestream preview element comprises at least a reservation identification; and in response to a trigger operation for the reservation control or the reservation identification, reserving the second livestream of the streamer.

16. The non-transitory computer-readable storage medium of claim 15, wherein the second livestream comprises a next livestream adjacent to the first livestream or all livestreams to be started of the streamer.

17. The non-transitory computer-readable storage medium of claim 15, wherein displaying the livestream preview element comprises:

based on a livestream preview function being enabled and the livestreaming information of the second livestream being configured, displaying the livestream preview element on the livestreaming page of the first livestream, wherein the livestream preview element further comprises the livestreaming information.

18. The non-transitory computer-readable storage medium of claim 15, wherein the acts further comprise:

canceling display of the livestream preview element, and maintaining display of the reservation control on the livestreaming page.

19. The non-transitory computer-readable storage medium of claim 15, wherein the acts further comprise:

in response to the trigger operation for the reservation control or the reservation identification, synchronously adjusting display states of the reservation control and the reservation identification.

20. The non-transitory computer-readable storage medium of claim 15, wherein reserving the second livestream of the streamer comprises:

generating a reservation request for the second livestream of the streamer; and sending the reservation request to a server, wherein the reservation request is configured to obtain a livestreaming start reminder of the second livestream of the streamer, and establish a reservation association between a user and the second livestream of the streamer.

* * * * *